(12) United States Patent
Verhaeghe et al.

(10) Patent No.: US 9,861,041 B2
(45) Date of Patent: Jan. 9, 2018

(54) LOAD SENSOR FOR AN AGRICULTURAL BALER

(71) Applicant: CNH Industrial America LLC, New Holland, PA (US)

(72) Inventors: Didier Verhaeghe, Ypres (BE); Johan Vande Ryse, Bruges (BE); Tom Coen, Zemst (BE)

(73) Assignee: CNH Industrial America LLC, New Holland, PA (US)

( * ) Notice: Subject to any disclaimer, the term of this patent is extended or adjusted under 35 U.S.C. 154(b) by 95 days.

(21) Appl. No.: 14/895,729

(22) PCT Filed: Jun. 3, 2014

(86) PCT No.: PCT/EP2014/061484
§ 371 (c)(1),
(2) Date: Dec. 3, 2015

(87) PCT Pub. No.: WO2014/195314
PCT Pub. Date: Dec. 11, 2014

(65) Prior Publication Data
US 2016/0120129 A1 May 5, 2016

(30) Foreign Application Priority Data
Jun. 3, 2013 (BE) .................................. 2013/0390

(51) Int. Cl.
*B30B 15/26* (2006.01)
*A01F 15/08* (2006.01)
*A01F 15/04* (2006.01)

(52) U.S. Cl.
CPC ........ *A01F 15/0825* (2013.01); *A01F 15/042* (2013.01)

(58) Field of Classification Search
CPC .................. A01F 15/0825; A01F 15/08; A01F 2015/0795
USPC ........................................................... 100/43
See application file for complete search history.

(56) References Cited

U.S. PATENT DOCUMENTS

| | | | | | |
|---|---|---|---|---|---|
| 2,576,784 | A | * | 11/1951 | Dodds ................. | A01F 15/0825 100/191 |
| 2,582,672 | A | * | 1/1952 | Raymond ........... | A01F 15/0825 100/192 |
| 2,708,872 | A | * | 5/1955 | Lauck ................. | A01F 15/0825 100/192 |
| 3,424,081 | A | * | 1/1969 | Hoke .................. | A01F 15/0825 100/192 |

(Continued)

FOREIGN PATENT DOCUMENTS

| | | |
|---|---|---|
| DE | 4140483 C2 | 3/1994 |
| EP | 0346586 B1 | 3/1992 |

(Continued)

*Primary Examiner* — Arpad Fabian-Kovacs
(74) *Attorney, Agent, or Firm* — Patrick M. Sheldrake

(57) ABSTRACT

An agricultural baler system includes a bale chamber, a compressing device and at least one sensor. The compressing device is coupled to the bale chamber and periodically compresses gathered crop material in the bale chamber. The sensor is coupled to the bale chamber and it produces a signal. The signal contains information that includes the load on at least one of the compressing device and the density of the forming bale.

15 Claims, 4 Drawing Sheets

(56) References Cited

U.S. PATENT DOCUMENTS

| | | | | |
|---|---|---|---|---|
| 3,866,529 A | * | 2/1975 | Holman | A01F 15/0825 100/192 |
| 4,168,659 A | * | 9/1979 | Yatcilla | B30B 9/3025 100/43 |
| 4,489,648 A | * | 12/1984 | Naaktgeboren | A01F 15/0825 100/191 |
| 4,624,180 A | | 11/1986 | Strosser | |
| 4,627,341 A | | 12/1986 | Sudbrack et al. | |
| 4,750,418 A | | 6/1988 | Naaktgeboren | |
| 5,123,338 A | * | 6/1992 | Mathis | A01F 15/0825 100/192 |
| 5,735,199 A | * | 4/1998 | Esau | A01F 15/0825 100/191 |
| 5,819,643 A | * | 10/1998 | McIlwain | A01F 15/0825 100/192 |
| 6,026,741 A | | 2/2000 | Lippens et al. | |
| 6,112,507 A | * | 9/2000 | Mesmer | A01F 15/0825 100/88 |
| 7,703,391 B2 | * | 4/2010 | Duenwald | A01F 15/0715 100/35 |
| 9,010,240 B2 | * | 4/2015 | Missotten | A01F 15/0825 100/188 R |
| 2014/0090568 A1 | | 4/2014 | Missotten et al. | |

FOREIGN PATENT DOCUMENTS

| | | | |
|---|---|---|---|
| EP | 0803183 | A1 | 10/1997 |
| FR | 2360413 | A1 | 3/1978 |

\* cited by examiner

LOAD SENSOR FOR AN AGRICULTURAL BALER

This application is the US National Stage filing of International Application Serial No. PCT/EP2014/061484 filed on Jun. 3, 2014 which claims priority to Belgian Application BE2013/0390 filed Jun. 3, 2013, each of which is incorporated herein by reference in its entirety.

FIELD OF THE INVENTION

The present invention relates to agricultural balers, and, more particularly, to sensors used on such agricultural balers.

DESCRIPTION OF THE RELATED ART

Agricultural balers are used to consolidate and package crop material so as to facilitate the storage and handling of the crop material for later use. In the case of hay, a mower-conditioner is typically used to cut and condition the crop material for windrow drying in the sun. In the case of straw, an agricultural combine discharges non-grain crop material from the rear of the combine defining the straw (such as wheat or oat straw) which is to be picked up by the baler. The cut crop material is typically raked and dried, and a baler, such as a large square baler or round baler, straddles the windrows and travels along the windrows to pick up the crop material and form it into bales.

On a large square baler, a pickup unit at the front of the baler gathers the cut and windrowed crop material from the ground. The pickup unit includes a pickup roll, and optionally may include other components such as side shields, stub augers, wind guard, etc.

A packer unit is used to move the crop material from the pickup unit to a duct or pre-compression chamber. The packer unit forms a wad of crop within the pre-compression chamber which is then transferred to a main bale chamber. (for purposes of discussion, the charge of crop material within the pre-compression chamber will be termed a "wad", and the charge of crop material after being compressed within the main bale chamber will be termed a "flake"). Typically such a packer unit includes packer tines or forks to move the crop material from the pickup unit into the pre-compression chamber. Instead of a packer unit it is also known to use a rotor cutter unit which may chop the crop material into smaller pieces.

A stuffer unit transfers the wad of crop material in charges from the pre-compression chamber to the main bale chamber. Typically such a stuffer unit includes stuffer forks which are used to move the wad of crop material from the pre-compression chamber to the main bale chamber, in sequence with the reciprocating action of a plunger within the main bale chamber.

In the main bale chamber, after the wad is injected into the bale chamber, the plunger compresses the wad of crop material into a flake against previously formed flakes to form a bale and, at the same time, gradually advances the bale toward the outlet of the bale chamber. Pressure exerted by the walls of the bale chamber dictates the frictional force required to overcome static friction and shift the flakes in the chamber. An increased force to shift the flakes causes the plunger to compact the flakes tighter, to thereby produce a higher density bale.

The bale chamber typically has three moving walls (the top and two sides), which may be positioned by two hydraulically controlled actuators connected to a cam mechanism. When enough flakes have been added and the bale reaches a full (or other predetermined) size, a number of knotters are actuated which wrap and tie twine, cord or the like around the bale while it is still in the main bale chamber. The twine is cut and the formed baled is ejected out the back of the baler as a new bale is formed.

As the bale is being formed a sensor associated with the drive train of the plunger is used to determine the loads encountered by the plunger to estimate the density of the bale. This approach, also described in detail in U.S. Pat. No. 4,624,180 or EP 0 346 586, has limited precision for many reasons, for example, due to tolerance in the alignment of the gearbox driving the plunger or the losses in the drive train. Another reason is that the varying size of the wads can alter the information from such a sensor. The plunger will remain for a longer period of time into contact with the material if the wads are bigger, then when the wads are thinner, resulting in an inaccurate signal.

U.S. Pat. No. 6,026,741 shows, apart from a sensor in the region of the plunger, a second sensor switch monitoring the movement of a hay dog installed above the baling chamber slot. This sensor switch will simply detect the passage of a new charge of crop material there along. As long as no new passage of crop material is detected by the sensor switch, subsequent load peaks detected by the sensor on the plunger will not influence the setting of the movable portion of the baling chamber. Although the influence of false signals detected by the sensor on the plunger is eliminated by using a sensor switch to monitor the presence of a new portion of material, it will not resolve the other mentioned problems occurring when using a sensor in the region of the plunger.

FR 2 360 413 discloses a baler having an automated control system for repositioning the doors depending on the friction of the material in the baling chamber. When material with a higher friction coefficient is in the chamber, it will pull on the walls thus narrowing the passage through which the crop is pushed. When the door is out of its normal position due to this increased friction, a positioning sensor will detect this, and allow a hydraulic circuit to open a specific valve such that hydraulic pressure is send to a cylinder operating on the door to keep the position of the door constant regardless of the friction in the crop material.

What is needed in the art is a sensor placement and system which will accurately determine the density of the forage material in the bale chamber and to additionally determine the load on the plunger, and is also easily configured to adjust the bale density.

SUMMARY OF THE INVENTION

The present invention provides a sensor placement associated with the bale chamber and uses deflection of the structural members to determine the density of the forming bale.

The invention in one form is directed to an agricultural baler system including a gathering device, a bale chamber, a compressing device and at least one sensor. The gathering device is configured to gather crop material. The bale chamber is coupled to the gathering device, with at least some of the crop material being directed into the bale chamber. The compressing device is coupled to the bale chamber. The compressing device periodically compresses the crop material in the bale chamber. The sensor is coupled to the bale chamber and it produces a signal. The signal contains information that includes the load on the compressing device and/or the density of the crop material.

The invention in yet another form is directed to a method of positioning an information gathering system in an agricultural baler including the steps of gathering crop material into a bale chamber, periodically compressing the crop material and coupling at least one sensor to the bale chamber. The periodically compressing the crop material step includes using a compressing device operating within the bale chamber to compress the crop material. The coupling at least one sensor to the bale chamber includes connecting the sensor to an element of the bale chamber. The sensor produces a signal containing information. The information includes a load on the compressing device and/or the density of the forming bale.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplifications set out herein illustrate an embodiment of the invention in one form, and such exemplification is not to be construed as limiting the scope of the invention in any manner.

DETAILED DESCRIPTION OF THE INVENTION

Figure 1:
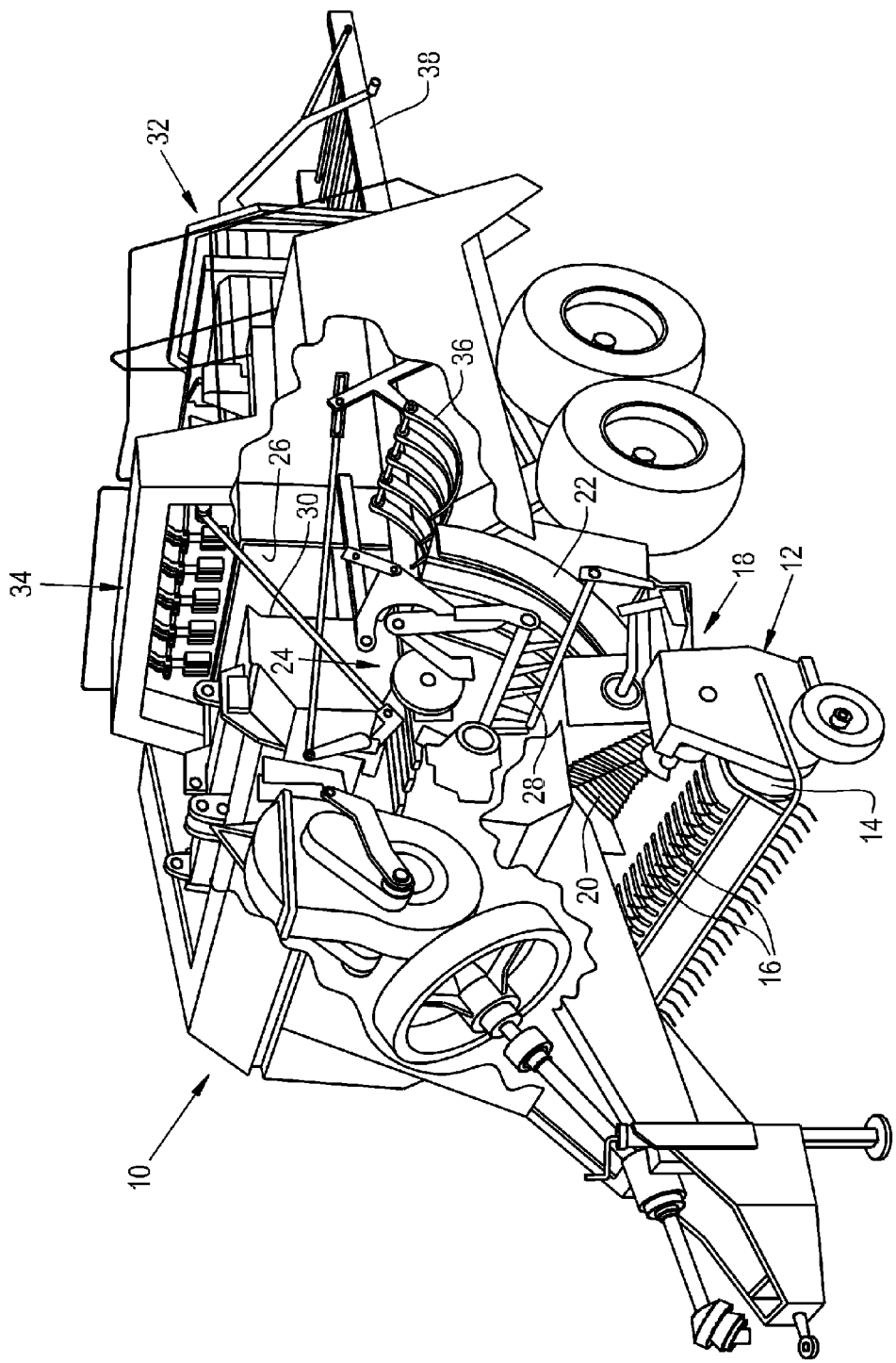
FIG. 1 is a perspective cutaway view showing the internal workings of a large square baler having a bale chamber having an embodiment of a sensor of the present invention associated therewith.

Referring now to the drawings, and more particularly to FIG. 1, there is shown an agricultural harvester in the form of a large square baler 10. FIG. 1 is a perspective cutaway view showing the internal workings of a large square baler 10. In the specific embodiment shown, the baler 10 is a New Holland BB960 which is manufactured and sold by the assignee of the present invention.

The baler 10 operates on a two stage feeding system. Crop material is lifted from windrows into the baler 10 using a pickup unit 12. The pickup unit 12 includes a rotating pickup roll 14 with tines 16 which move the crop rearward toward a packer unit 18. An optional pair of stub augers (one of which is shown, but not numbered) are positioned above the pickup roll 14 to move the crop material laterally inward. The packer unit 18 includes packer tines 20 which push the crop into a pre-compression chamber 22 to form a wad of crop material. The packer tines 20 intertwine the crop together and pack the crop within pre-compression chamber 22. The pre-compression chamber 22 and the packer tines 20 function as the first stage for crop compression. Once the pressure in the pre-compression chamber 22 reaches a predetermined sensed value, a stuffer unit 24 moves the wad of crop from the pre-compression chamber 22 to a bale chamber 26. The Stuffer unit 24 includes stuffer forks 28 which thrust the wad of crop directly in front of a plunger 30, which reciprocates within the bale chamber 26 and compresses the wad of crop into a flake. The stuffer forks 28 return to their original stationary state after the wad of material has been moved into the bale chamber 26. The plunger 30 compresses the wads of crop into flakes to form a bale and, at the same time, gradually advances the bale toward an outlet 32 of the bale chamber 26. The bale chamber 26 and plunger 30 function as the second stage for crop compression. When enough flakes have been added and the bale reaches a full (or other predetermined) size, the knotters 34 are actuated which wrap and tie twine around the bale while it is still in the bale chamber 26. Needles 36 bring the lower twine up to the knotters 34 and the tying process then takes place. The twine is cut and the formed baled is ejected from a discharge chute 38 as a new bale is formed.

Figure 2:
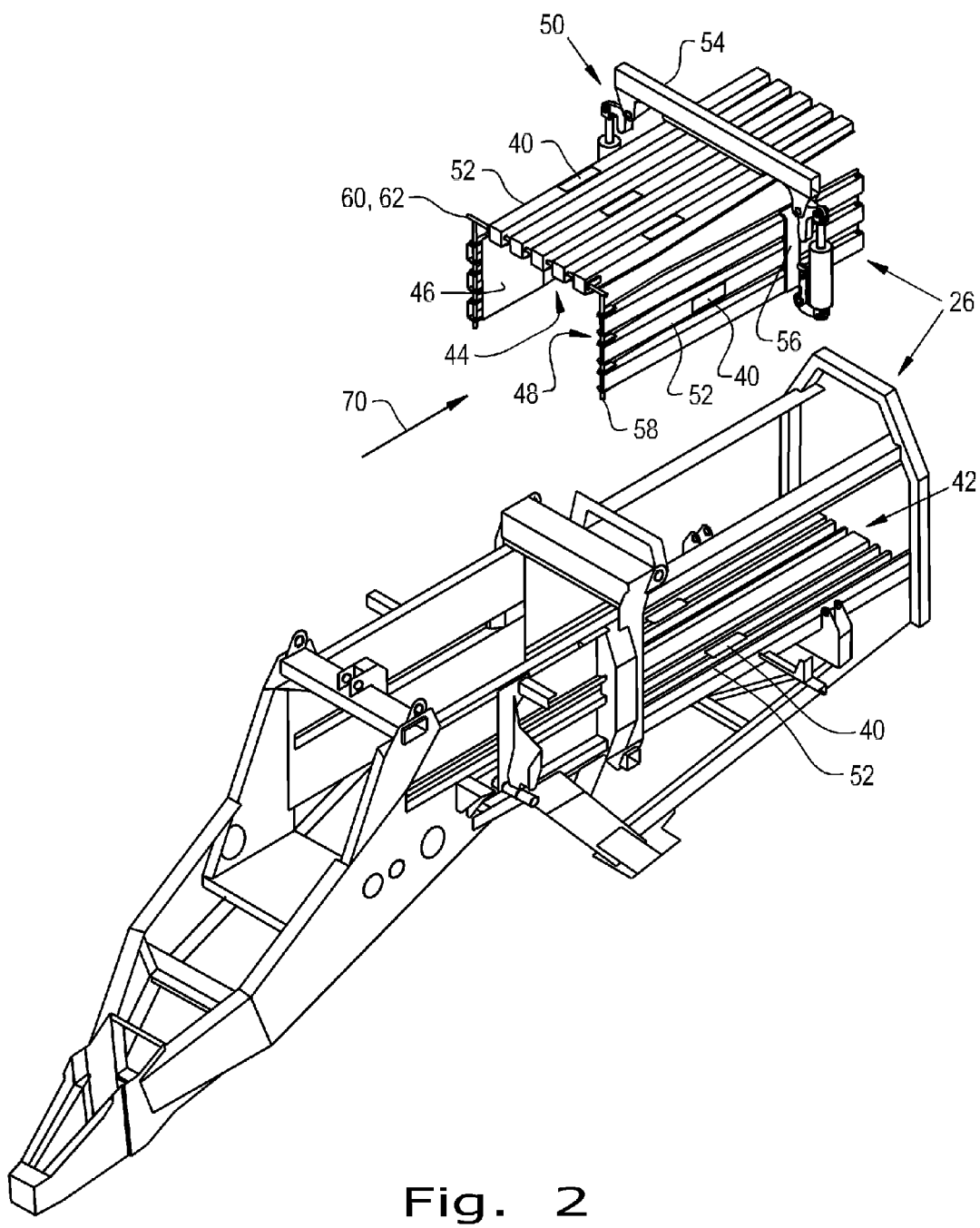
FIG. 2 is a partially exploded view illustrating the bale chamber of FIG. 1.

Referring now to FIG. 2 some framework of the baler system 10 is revealed with the bale chamber 26 illustrated in an exploded view to better illustrate the placement of sensors 40 relative to bale chamber 26. Bale chamber 26 is defined by a floor 42, a ceiling 44 and walls 46 and 48. For purposes of discussion floor 42 will be considered fixed relative to the framework and the ceiling 44 and the walls 46 and 48 are movable by the action of a density ring actuator system 50. The bale chamber 26 has a cross-section that is variable as determined by the density ring actuator system 50. The ceiling 44 and the walls 46 and 48 are shown in FIG. 2 as being expanded out creating an outward taper allowing a bale to easily pass through the bale chamber 26. Under normal use the bale chamber 26 is positioned by the density ring actuator system 50 to be tapered inwardly leading to a reduced cross section as the bale moves through the bale chamber 26. The control of the cross section of the bale chamber 26 leads directly to the control of the density of the bale that is formed in the bale chamber 26, since a more inwardly tapered configuration increases the restriction of travel of the bale.

The floor 42, ceiling 44 and walls 46 and 48 each have at least one structural member 52 extending along a bale forming direction 70. The structural members 52 are what contain the bale and serve to restrict the movement of the bale as it travels through the bale chamber 26. The plunger 30, also referred to as a compressing device 30 is not shown in FIG. 2 for the purpose of clarity. The plunger 30 pushes the wad against the previously formed flakes causing a movement of the forming bale in the bale forming direction 70. This compression of the crop material in the bale is a force that is conveyed by way of the crop material to the structural members 52. When the plunger 30 retracts there is some rebound of portions of the bale and the now reduced force on the bale is also felt by the structural members 52.

The sensors 40 are positioned on selected structural members 52 to detect an amount of force being conveyed to the structural members 52. This detected force contains information relative to both the load on the plunger 30 as it is compressing the crop material as well as the density of the crop material in the bale. The structural members 52 are held by support members, here illustrated as the support members 54 and 60 holding the structural members 52 associated with the ceiling 44 and the support members 56 and 58 holding the structural members 52 associated with the wall 48. In a like manner the structural members 52 associated with the wall 46 are also constrained. The sensors 40 are shown as being located on the structural members 52 proximate to the midpoint between the respective support members 54, 56, 58 and 60. The sensors 40 are also shown in a plane normal to the bale forming direction 70, although other positions are also contemplated. It is further contemplated that multiple sensors can be placed along the bale chamber 26 to get further information. For example, the supports of the floor 42 are closer together and the sensors are positioned midway between the crossbeams to get maximal effect.

Figure 3:
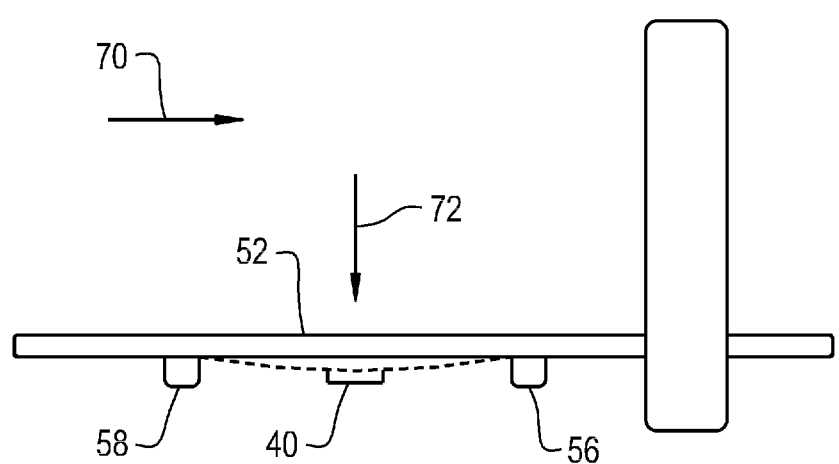
FIG. 3 is a schematical view of a structural member of the bale chamber of FIGS. 1 and 2, illustrating the use of the sensor of the present invention.

Now, additionally referring to FIG. 3 there is illustrated, in a schematical form, the support members 56 and 58 with the structural member 52 extending therebetween and therebeyond. The dashed line illustrates a flexure of the structural member 52, with the sensor 40 being coupled thereto, so as to detect the flexure of the structural member 52 between support members 56 and 58, as the pressure 72 (illustrated by an arrow 72) of the crop material against the structural member 52 is applied. As the pressure 72 varies the sensor 40 detects the variation of the flexure of the structural member 52 and creates a signal representative of the varying pressure. The information includes a pulsed or variable portion and a slowly varying or steady state portion. The pulsed or variable portion is attributed to the periodic force imparted by the plunger 30 to the forming bale and the steady state portion is attributed to a density of the forming bale. The information is interpreted and acted upon to control the density of the bale formed in the bale chamber 26.

The support member 60 is a pivotal connection 62 between the framework of the baler 10 and the structural members 52 that are associated with the ceiling 44. In a similar fashion, the structural members 52 associated with the walls 46 and 48 are pivotally connected to the framework of the baler 10. The structural members 52 of the floor 42 are not pivotally connected to the framework. Regardless, the principle illustrated in FIG. 3 is applicable to all of the structural members 52.

The sensors 40 may be considered to be an array of sensors with the information coming from them producing a three dimensional density distribution as the bale travels in the bale formation direction 70. The sensors 40 may all be identical or it is also contemplated that a variety of sensor types may be utilized. The sensors 40 may take the form of a displacement sensor, a deflection sensor or a strain sensor. A displacement sensor refers to a sensor that detects the displacement of the structural member 52 as it flexes. A deflection sensor refers to a sensor that detects angular movement or the deflection of the structural member 52 as it flexes. A strain sensor refers to a sensor that detects the strain in the structural member 52 as it flexes. The sensors 40 produce the signal reflective of the varying pressure on the structural member 52.

Figure 4:
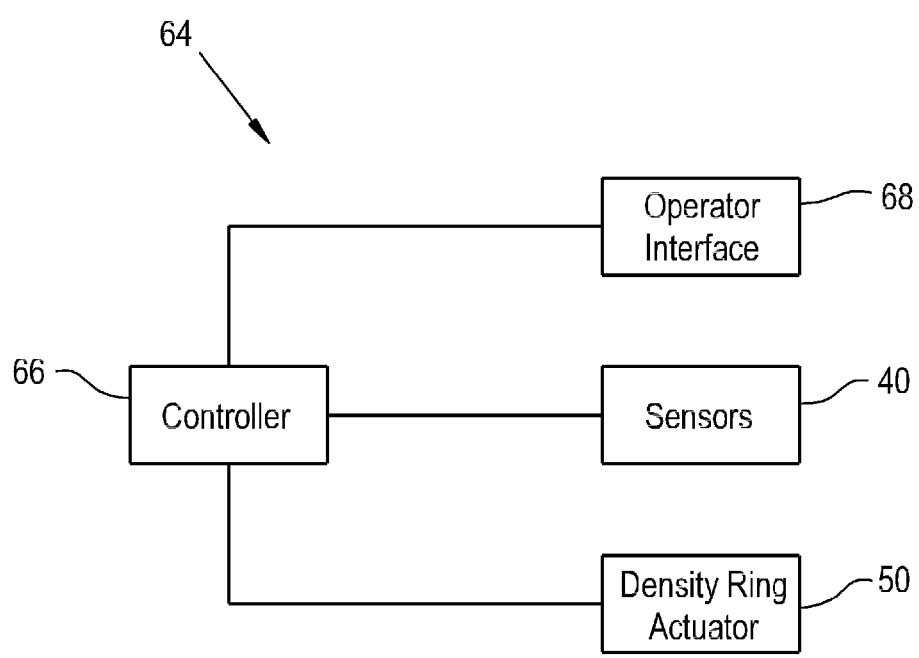
FIG. 4 is a schematical view of an embodiment of a control system of the present invention used in the baler system illustrated in FIGS. 1-3.

Now, additionally referring to FIG. 4 there is illustrated, in a schematical form, a control system 64 having a controller 66 and an operator interface 68. The controller 66 receives signals from sensors 40, with the signals containing the information discussed herein. The information is processed and scaled to reflect the load on the plunger 30 and/or the density of the bale in the bale chamber 26. The controller 66 is in control of the density ring actuator 50 to thereby change the positioning of structural members 52 and thence the density of the bales produced in bale chamber 26. The operator interface 68 receives and displays information from the controller 66 as well as conveys instructions from an operator to the controller 66. The information displayed may include the load on the plunger 30 and/or the density of the bale in the bale chamber 26. The controller 66 is configured to adjust the positioning of the structural members 52 to thereby alter the load on the plunger 30 and/or the density of the bales being formed.

It is also contemplated that information such as the pressure reflected in the hydraulic fluid of the actuators of density ring actuator 50, as a result of the outward pressure of the forming bale, can be used to provide the signal used by controller 66. Additionally, the known selected cross-sectional area that is set by the position of the density ring actuator 50 can be used in the bale density calculation process. It is further contemplated to use a weighing system, located at the back of the baler 10, to obtain the weight of the complete bale and to thereby get an absolute density of the bale. This information is then used by the controller 66 to control the absolute density of the formed bales.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. An agricultural baler system, comprising:
   a bale chamber configured to receive crop materials from a gathering device,
   a compressing device coupled to said bale chamber, said compressing device periodically compressing the crop material in said bale chamber;
   said bale chamber comprising at least one structural member having a longitudinal direction arranged in a direction of movement of a bale forming in the chamber, said structural member coupled to a first support member and a second support member; and
   at least one sensor coupled to said at least one structural member between said first support member and said second support member of the bale chamber, said at least one sensor connected to a controller, said at least one sensor configured to detect and transmit information representative of a force on the at least one structural member, wherein the controller is configured to determine therefrom information representative of at least one of a load on said compressing device and a density of the forming bale
   wherein said at least one structural member has an end that is pivotally coupled to said first support member, said at least one sensor located in a central portion of the structural member between said first support member and said second support member.

2. The agricultural baler system of claim 1, wherein said bale chamber includes a floor, a ceiling, a first side wall, and a second side wall, said at least one sensor being attached to the at least one structural member which forms at least a portion of at least one of said floor, said ceiling, said first wall and said second wall.

3. The agricultural baler system of claim 1, wherein said at least one sensor detects at least one of a strain and a deflection in a portion of at least one of said at least one structural member.

4. The agricultural baler system of claim 3, wherein said at least one sensor is a plurality of sensors including a first sensor and a second sensor, said first sensor being coupled to at least one structural members of one of said floor, said ceiling, said first wall and said second wall said second sensor being coupled to an other of said floor said ceiling, said first wall and said second wall.

5. The agricultural baler system of claim 4, wherein the crop material is formed into a bale having a general direction of travel, said first sensor and said second sensor being positioned at a substantially similar distance in said direction of travel.

6. The agricultural baler system of claim 3, wherein said at least one sensor is a plurality of sensors arranged in a plane.

7. The agricultural baler system of claim 6, wherein said plane is substantially normal to a direction of travel of the forming bale in the bale chamber.

8. The agricultural baler system of claim 1, further comprising a density ring actuator coupled to said bale chamber, said density ring actuator being controlled by said controller.

9. The agricultural baler system of claim 8, wherein said detected information is used by said controller to control at least one of said load on said compressing device and said density of the forming bale by changing an attribute of said density ring actuator.

10. The agricultural baler system of claim 9, wherein said at least one sensor is located upstream from said density ring actuator relative to movement of the forming bale in said bale chamber.

11. The agricultural baler system of claim 1, wherein said at least one sensor is one of a displacement sensor, a deflection sensor and a strain sensor.

12. A method of monitoring an agricultural baler having a bale chamber, the bale chamber comprising at least one structural member having a longitudinal direction arranged in a direction of movement of a bale forming in the chamber, said structural member coupled to a first support member and a second support member; the method comprising the steps of:

gathering crop material into said bale chamber;

periodically compressing the crop material with a compressing device operating within said bale chamber; and detecting with a sensor coupled to the at least one structural member and transmitting to a controller information representative of force on the at least one structural member;

determining with said controller at least one of a load on said compressing device and a density of the forming bale, wherein the at least one sensor is coupled to said at least one structural member between said first support member and said second support member of the bale chamber and said at least one structural member has an end that is pivotally coupled to said first support member, said at least one sensor located in a central portion of the structural member between said first support member and said second support member.

13. The method of claim 12, further comprising the step of controlling with the controller at least one of said load on said compressing device and said density of the forming bale by controlling a density ring actuator, said density ring actuator associated with said bale chamber.

14. The method of claim 13, wherein said at least one sensor is located upstream from said density ring actuator relative to movement of the forming bale in said bale chamber.

15. The method of claim 12, wherein said at least one sensor is one of a displacement sensor, a deflection sensor and a strain sensor.

* * * * *